W. E. MOORE.
TROLLEY.
APPLICATION FILED FEB. 16, 1912.
1,119,978.
Patented Dec. 8, 1914.
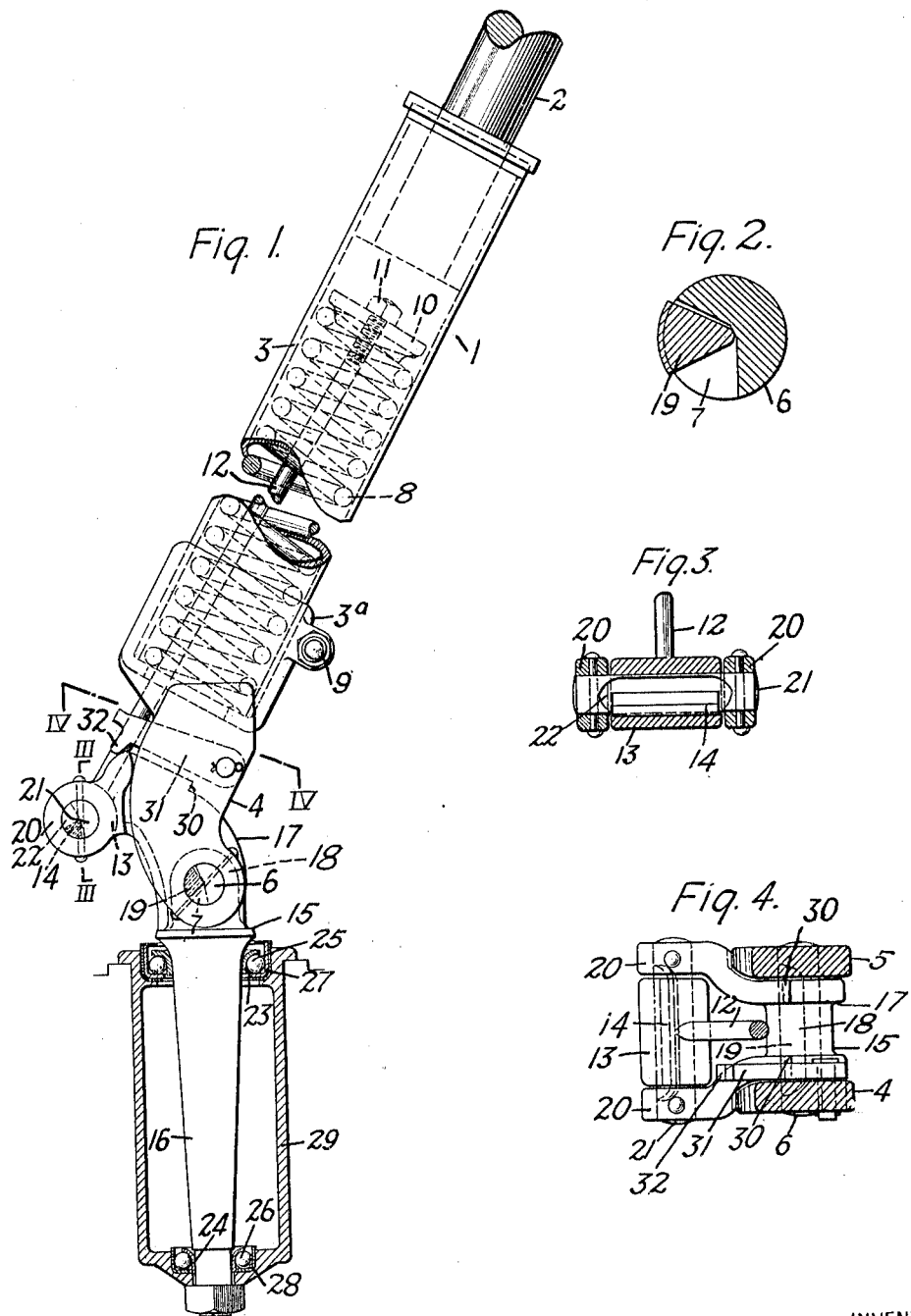

UNITED STATES PATENT OFFICE.

WILLIAM ENOCH MOORE, OF PITTSBURGH, PENNSYLVANIA, ASSIGNOR TO R. D. NUTTALL COMPANY, A CORPORATION OF PENNSYLVANIA.

TROLLEY.

1,119,978.  Specification of Letters Patent.  Patented Dec. 8, 1914.

Application filed February 16, 1912. Serial No. 678,085.

*To all whom it may concern:*

Be it known that I, WILLIAM ENOCH MOORE, a citizen of the United States, and a resident of Pittsburgh, in the county of Allegheny and State of Pennsylvania, have invented a new and useful Improvement in Trolleys, of which the following is a specification.

My invention relates to trolleys for electrically propelled vehicles, and it has for its object to provide a device of this character which shall be strong and durable, susceptible of ready adaptation and manipulation, and free from derangement and excessive wear when utilized in the service for which it is intended.

In the accompanying drawing, Figure 1 is a view, partially in side elevation and partially in vertical section, of a trolley pole and base embodying my invention, portions of the pole being broken away. Fig. 2 is a detail view of the bearing pin and rocker for the trolley pole. Fig. 3 is a sectional view on line III—III of Fig. 1, and Fig. 4 is a sectional view on line IV—IV of Fig. 1.

The trolley pole 1 comprises a main or upper portion 2 which may be of wood or other suitable material, and a tubular lower end portion 3 preferably of steel, such lower end portion being clamped in a socket 3ᵃ that is provided with two downwardly projecting arms 4 and 5, the lower ends of which are provided with holes to receive a rigidly anchored pin 6. One side of the pin 6 is provided with a recess 7 of triangular or V-shape, the length of this recess being equal to, or slightly greater than, the space between the arms 4 and 5. Mounted within the tubular portion 3 of the trolley pole is a helical spring 8, the lower end of which bears against the lower closed end of the cylindrical socket member 3ᵃ in which the tubular member 3 is clamped by a bolt 9, and upon the upper end of the spring rests a head or block 10. Fastened to the head or block 10 by means of a nut 11, is a rod 12 that projects downwardly through the spring and is provided at its lower end with a tubular head 13 in which is mounted a rocker 14 of triangular or V-shape in cross section.

The base 15 of the trolley comprises a vertical tapering shaft 16 and a frame portion 17. Adjacent to the upper end of the shaft 16, the frame 17 is provided with a socket 18 for a rocker 19 of V-shape in cross section, the edge of which is seated in the bottom of the recess 7 in the pin 6, the two members 6 and 19 constituting a knife-edge bearing between the trolley pole and the base.

Projecting upwardly and laterally from the socket portion 18, are two arms 20 in which are mounted and securely fastened the ends of a pin 21, one side of which is provided with a recess 22 of V-shape to receive the rocker 14 at the lower end of the rod 12, thus providing a knife-edge bearing between the head 13 and the frame 17.

The upper end of the shaft 16 is provided with a ball race 23, and its lower end is provided with a similar member 24 to be respectively engaged by sets of balls 25 and 26, the complementary races 27 and 28 being located in the respective ends of a bearing cylinder 29 which incloses the shaft 16. The space within the cylinder 29 and surrounding the shaft 16 is preferably filled with a mass of lubricating material.

It will be understood from the foregoing description that the rod 12 is disposed at a sufficient angle to the axis of the trolley pole, to insure maintenance of the pole in such elevated position that the trolley wheel, not shown, will engage the trolley conductor with sufficient force to provide the desired electrical contact, and that the knife-edge bearings provided by the rockers 14 and 19 and the recesses 22 and 7, will permit the trolley pole to move from one angular position to another with reference to the plane of the vehicle upon which it is mounted, with a minimum degree of friction, and without the necessity of employing lubricating means.

It will also be understood that the bearings for the trolley base are such as to insure a maximum freedom of rotary movement of the said base in order to insure the turning of the trolley pole upon the vehicle to follow the curves of the track and the trolley conductor.

In order to automatically lock the trolley pole in its lowered position, when desired, I provide the frame 17 with a notch or shoulder 30 and pivotally mount a latch 31 upon the arm 4 so that when the trolley pole is lowered, the nose 32 of the latch will engage the shoulder 30 and lock the trolley pole in that position until the latch is manually moved out of engagement with the shoulder.

Structural details may be varied within considerable limits if desired, and I therefore intend that only such limitations shall be imposed as are indicated in the appended claims.

I claim as my invention:

1. The combination with a trolley pole having a hollow lower end, of a base comprising a vertical shaft and a pole-supporting frame, a helical spring located within said hollow lower end, a block mounted upon the inner end of said spring and a rod extending from said block through said spring and pivotally attached to the pole-supporting frame at a point located within the space defined by an assumed outward prolongation of said spring.

2. The combination with a trolley pole having a tubular lower end, of a rotatably supported base to which said pole is pivoted, a helical spring within said tubular end, a rod pivotally-connected to said base at a point located within the space defined by an assumed outward prolongation of said spring and extending through said spring, and a head to which the inner end of the rod is attached.

3. The combination with a trolley pole having a tubular lower end, of a base comprising a vertical rotatable shaft and a frame to which the trolley pole is pivotally connected, an elevating helical spring within said tubular end, and a spring-compressing rod disposed within said spring and having a spring-engaging block at its inner end and a pivotal connection to said frame at its other end at a point located within the space defined by an assumed outward prolongation of said spring.

4. The combination with a trolley pole having a helical elevating spring inclosed within its lower end, of a rotatable base for said pole, a head mounted upon the inner end of said spring and a rod extending from said head through said spring and movably attached to said base at a point located within the space defined by an assumed outward prolongation of said spring.

5. The combination with a trolley pole and a rotatable base therefor, of a single elevating spring located within the trolley pole and a single rod hinge-connected to said base at a point located within the space defined by an assumed outward prolongation of said spring and having a head against which one end of said spring is seated.

6. The combination with a trolley pole having a tubular lower end, of a spring disposed therein, a pair of spaced arms secured to said end, a rotatable supporting member movably attached to said arms, a second pair of arms secured to the supporting member, and a rod disposed within said spring and operatively associated therewith and movably attached to said second pair of arms.

7. The combination with a trolley pole having a tubular lower end, of a helical spring disposed therein, a pair of spaced arms secured to said end, a pin affixed to said arms and having a triangular recess, a rotatable base member provided with a rocker member disposed in said recess, a second pair of arms secured to the base member, a rod disposed within said spring and operatively associated with the inner end thereof, a second pin secured to said second pair of arms, and a tubular head attached to said rod and having a knife-edge bearing connection with said second pin.

8. The combination with a trolley pole having a tubular lower end, of a helical spring disposed therein, a pair of spaced arms secured to said end, a rotatable tapered supporting member having a knife-edge bearing intermediate said arms, a bearing member surrounding said supporting member and having a plurality of ball-bearing connections therewith, a second pair of arms secured to said supporting member, and a rod disposed within said spring and having a spring-engaging block at its inner end and a knife-edge bearing intermediate said second pair of arms.

9. The combination with a pivotal supporting base and a trolley pole having a tubular lower end and curved arms associated therewith and pivotally connected to said base, of a compression spring disposed within said tubular end of said pole, a spring-engaging block associated with the upper end thereof and a pull rod coöperating with said block and projecting through said spring and pivotally connected to said base adjacent to the pivotal connection of said pole.

10. The combination with a pivotal supporting base and a tubular trolley pole having end members projecting laterally outside the space defined by an assumed prolongation of the pole and pivotally connected to said base, of an elevating helical compression spring disposed within the lower end of said pole, and a pull rod associated with the inner end of said spring and projecting therethrough, said pull rod having a pivotal connection to said base within the space defined by an assumed outward prolongation of said spring.

11. The combination with a supporting base and a trolley pole, of an elevating helical spring disposed within the lower end of said pole and a pull rod projecting through said spring and attached to the inner end thereof, said pole and said rod being pivotally associated with said base at points respectively located without and within the space defined by an assumed outward prolongation of said spring.

In testimony whereof, I have hereunto subscribed my name this 3rd day of Feb., 1912.

WILLIAM ENOCH MOORE.

Witnesses:
J. E. BEAM,
E. M. BALSINGER.

Copies of this patent may be obtained for five cents each, by addressing the " Commissioner of Patents, Washington, D. C."